United States Patent
Noguchi et al.

(10) Patent No.: US 8,037,975 B2
(45) Date of Patent: Oct. 18, 2011

(54) PISTON SEAL MEMBER AND DISC BRAKE USING THE PISTON SEAL MEMBER

(75) Inventors: Toru Noguchi, Ueda (JP); Hiroyuki Ueki, Ueda (JP); Takumi Sagou, Nagano (JP); Takushi Matsushita, Konosu (JP); Tsuyoshi Watanabe, Ina-machi (JP)

(73) Assignees: Nissin Kogyo Co., Ltd., Nagano (JP); Fukoku Co., Ltd., Saitama (JP)

( * ) Notice: Subject to any disclaimer, the term of this patent is extended or adjusted under 35 U.S.C. 154(b) by 910 days.

(21) Appl. No.: 12/071,469

(22) Filed: Feb. 21, 2008

(65) Prior Publication Data
US 2008/0216646 A1 Sep. 11, 2008

(30) Foreign Application Priority Data
Mar. 8, 2007 (JP) .................. 2007-058408

(51) Int. Cl.
*F16D 65/00* (2006.01)
(52) U.S. Cl. ........ 188/73.1; 188/71.1; 524/496; 92/168; 277/540; 277/434; 277/438
(58) Field of Classification Search ............... 188/73.12; 524/496, DIG. 47; 277/532, 534, 540, 434–498
See application file for complete search history.

(56) References Cited

U.S. PATENT DOCUMENTS

| | | | |
|---|---|---|---|
| 3,438,932 A | 4/1969 | Sieron | |
| 3,562,195 A | 2/1971 | Reiner et al. | |
| 4,161,239 A | 7/1979 | Karasudani | |
| 4,524,677 A | 6/1985 | Ashman et al. | |
| 4,858,516 A | 8/1989 | Klein | |
| 5,076,593 A | 12/1991 | Sullivan et al. | |
| 5,252,659 A | 10/1993 | Koizumi et al. | |
| 5,260,111 A | 11/1993 | Valaitis et al. | |
| 5,728,766 A | 3/1998 | Schauder et al. | |
| 6,046,806 A | 4/2000 | Thompson | |
| 6,274,665 B2 | 8/2001 | Ono et al. | |
| 6,642,291 B2 | 11/2003 | Chino et al. | |
| 6,784,255 B1 | 8/2004 | Nakahama et al. | |
| 6,881,770 B2 | 4/2005 | Mizuno et al. | |
| 2004/0256187 A1* | 12/2004 | Noguchi et al. | 188/370 |
| 2005/0027060 A1 | 2/2005 | Yagi et al. | |

(Continued)

FOREIGN PATENT DOCUMENTS

EP 1 469 240 A1 10/2004

(Continued)

*Primary Examiner* — Robert Siconolfi
*Assistant Examiner* — San Aung
(74) *Attorney, Agent, or Firm* — Oliff & Berridge, PLC

(57) ABSTRACT

The piston seal member is formed of a crosslinked rubber composition, the rubber composition including 100 parts by weight of an ethylene-propylene rubber, 20 to 60 parts by weight of a first carbon black, 50 to 100 parts by weight of a second carbon black, and 5 to 20 parts by weight of carbon nanofiber having an average diameter of 0.5 to 500 nm, the total amount of the first carbon black and the second carbon black being 70 to 160 parts by weight. The first carbon black has an average particle diameter of 35 to 100 nm and a DBP absorption of 50 to 200 ml/100 g. The second carbon black has an average particle diameter that is greater than the average particle diameter of the first carbon black and ranges from 60 to 500 nm and a DBP absorption of 5 to 50 ml/100 g.

8 Claims, 3 Drawing Sheets

U.S. PATENT DOCUMENTS

| | | |
|---|---|---|
| 2005/0096424 A1 | 5/2005 | Otsuji et al. |
| 2007/0256903 A1 | 11/2007 | Noguchi et al. |

FOREIGN PATENT DOCUMENTS

| | | | |
|---|---|---|---|
| GB | 1050021 | | 12/1966 |
| GB | 2 119 874 A | | 11/1983 |
| JP | A-1-108289 | | 4/1989 |
| JP | B2-3-59291 | | 9/1991 |
| JP | A-7-508770 | | 9/1995 |
| JP | 11-153168 | * | 6/1999 |
| JP | A-2000-241736 | | 9/2000 |
| JP | A-2002-348424 | | 12/2002 |
| JP | A-2003-160692 | | 6/2003 |
| JP | A-2003-253067 | | 9/2003 |
| JP | A-2004-232786 | | 8/2004 |
| JP | A-2004-316773 | | 11/2004 |
| RO | 117023 B1 | | 9/2001 |
| WO | WO 92/07207 | | 4/1992 |
| WO | WO 01/07516 A1 | | 2/2001 |

\* cited by examiner

PISTON SEAL MEMBER AND DISC BRAKE USING THE PISTON SEAL MEMBER

Japanese Patent Application No. 2007-58408, filed on Mar. 8, 2007, is hereby incorporated by reference in its entirety.

BACKGROUND OF THE INVENTION

The present invention relates to a piston seal member and a disc brake using the piston seal member.

A piston seal member is generally formed of a crosslinked rubber composition containing rubber as the main component. For example, a vehicular disc brake is equipped with a caliper body including a piston and a cylinder. A piston seal member is provided in a ring-shaped groove formed in the inner circumferential surface of the cylinder. In the disc brake, brake pads are pressed against a disc rotor secured on each wheel by applying hydraulic brake pressure to stop rotation of the wheel due to the friction force of the brake pads made of a friction material. The piston seal member has a role of sealing a brake fluid and a role of returning (rolling back) the piston which has moved forward due to hydraulic brake pressure. The brake pads are pressed against the disc by causing the piston to move forward in a cylinder bore by applying hydraulic brake pressure.

Specifically, the piston seal member enables the cylinder and the piston inserted into the cylinder bore to come into contact in a fluid-tight and movable manner. The piston which has moved forward due to hydraulic pressure is rolled back by the piston seal member (see JP-B-3-59291, for example). Therefore, the piston seal member is required to have toughness for securely sealing the brake fluid and elasticity for returning (rolling back) the piston which has moved forward due to hydraulic pressure.

The temperature of the caliper body of the disc brake increases during the operation due to frictional heat which occurs between the disc rotor and the brake pads. Therefore, the piston seal member is also subjected to high temperature. The piston seal member formed of a rubber composition thermally expands and exhibits a decreased modulus of elasticity at a high temperature. In this case, the amount of roll-back of the piston changes due to thermal expansion and a decrease in modulus of elasticity of the piston seal member, whereby the working allowance of the brake changes. For example, the amount of stroke of a brake lever for a motor-cycle disc brake changes, whereby the driver may feel that the brake operation is incorrect.

To deal with this problem, a piston seal member has been proposed which is formed of a rubber composition in which at least 100 parts by weight of carbon black is added based on 100 parts by weight of ethylene-propylene rubber (see JP-A-2004-316773, for example).

A piston seal member has also been proposed which is formed of a rubber containing at least either carbon fibers (including carbon nanofibers) or fullerene (see JP-A-2004-232786, for example).

However, a piston seal member exhibiting durability to a brake fluid at a high temperature of 200° C. or more has not yet been developed.

SUMMARY

According to a first aspect of the invention, there is provided a piston seal member which holds a cylinder bore and a piston that slides in the cylinder bore in a fluid-tight and slidable manner, the piston seal member being formed of a crosslinked rubber composition, the rubber composition including 100 parts by weight of an ethylene-propylene rubber, 20 to 60 parts by weight of a first carbon black, 50 to 100 parts by weight of a second carbon black, and 5 to 20 parts by weight of carbon nanofiber having an average diameter of 0.5 to 500 nm, the total amount of the first carbon black and the second carbon black being 70 to 160 parts by weight, the first carbon black having an average particle diameter of 35 to 100 nm and a DBP absorption of 50 to 200 ml/100 g, and the second carbon black having an average particle diameter that is greater than the average particle diameter of the first carbon black and ranges from 60 to 500 nm and a DBP absorption of 5 to 50 ml/100 g.

According to a second aspect of the invention, there is provided a disc brake comprising:

the above-described piston seal member;

a cylinder having the cylinder bore; and the piston inserted into the cylinder bore, the piston seal member being fitted into a ring-shaped groove formed in an inner wall of the cylinder bore, the piston seal member causing the piston inserted into the cylinder bore to come in contact with the cylinder in a fluid-tight and movable manner and rolling back the piston which has been moved forward due to hydraulic pressure.

DETAILED DESCRIPTION OF THE EMBODIMENT

Figure 1:
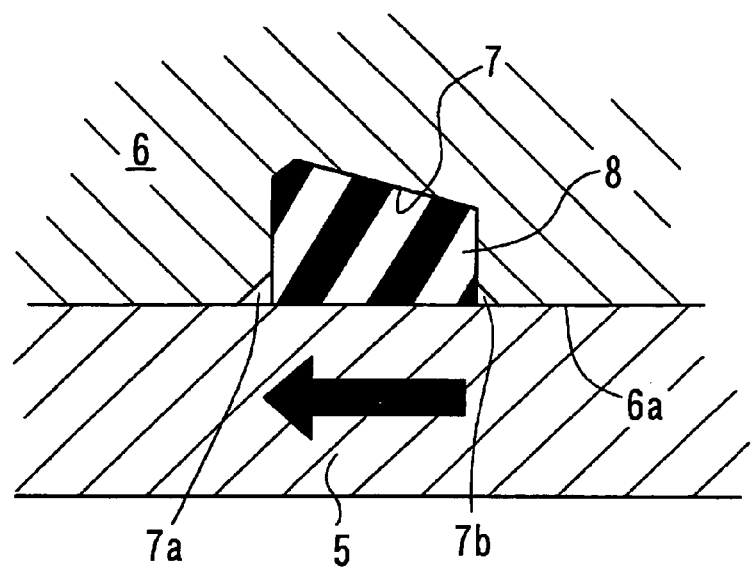
FIG. 1 is a cross-section schematically showing a piston seal member according to one embodiment of the invention.

The invention may provide a piston seal member exhibiting excellent heat resistance and a disc brake using the piston seal member.

According to one embodiment of the invention, there is provided a piston seal member which holds a cylinder bore and a piston that slides in the cylinder bore in a fluid-tight and slidable manner, the piston seal member being formed of a crosslinked rubber composition, the rubber composition including 100 parts by weight of an ethylene-propylene rubber, 20 to 60 parts by weight of a first carbon black, 50 to 100 parts by weight of a second carbon black, and 5 to 20 parts by weight of carbon nanofiber having an average diameter of 0.5 to 500 nm, the total amount of the first carbon black and the second carbon black being 70 to 160 parts by weight, the first carbon black having an average particle diameter of 35 to 100 nm and a DBP absorption of 50 to 200 ml/100 g, and the second carbon black having an average particle diameter that is greater than the average particle diameter of the first carbon black and ranges from 60 to 500 nm and a DBP absorption of 5 to 50 ml/100 g.

According to this embodiment, a piston seal member exhibiting excellent heat resistance can be obtained. Since a decrease in modulus of elasticity of the piston seal member accompanying an increase in temperature is reduced by utilizing the second carbon black, the piston seal member can maintain a high modulus of elasticity not only at a low temperature but also at a high temperature, whereby a decrease in sealing properties and followability rarely occurs. Since the piston seal member is reinforced by the first carbon black, the piston seal member exhibits improved durability. The piston seal member exhibits excellent durability at a high temperature by utilizing the carbon nanofibers.

In this piston seal member, the carbon nanofibers may be uniformly dispersed in the ethylene-propylene rubber; and the rubber composition in uncrosslinked form may have a first spin-spin relaxation time (T$2n$), measured at 150° C. by a Hahn-echo method using a pulsed NMR technique, of 100 to 3000 microseconds, and a fraction (fnn) of components having a second spin-spin relaxation time (T$2nn$) of less than 0.2.

In this piston seal member, the rubber composition may have a hardness (JIS-A) of 80 to 95.

In this piston seal member, the rubber composition may have a dynamic modulus of elasticity at 10 Hz and 30° C. of 60 to 90 MPa and a dynamic modulus of elasticity at 10 Hz and 200° C. of 30 to 40 MPa.

In this piston seal member, the rubber composition may have a compression set at 200° C. after 24 hours of 14% or less and a compression set at 230° C. after 24 hours of 24% or less.

In this piston seal member, the rubber composition may have an instantaneous strain of 2% or less and a steady-state strain of −2000 ppm/hour to +2000 ppm/hour in a creep test conducted at a temperature of 200° C. and a load of 250 KPa.

The piston seal member may be used for a caliper body of a disc brake.

According to one embodiment of the invention, there is provided a disc brake comprising:

the above-described piston seal member;
a cylinder having the cylinder bore; and
the piston inserted into the cylinder bore,
the piston seal member being fitted into a ring-shaped groove formed in an inner wall of the cylinder bore, the piston seal member causing the piston inserted into the cylinder bore to come in contact with the cylinder in a fluid-tight and movable manner and rolling back the piston which has been moved forward due to hydraulic pressure.

The embodiments of the invention will be described in detail below, with reference to the drawings.

Figure 2:
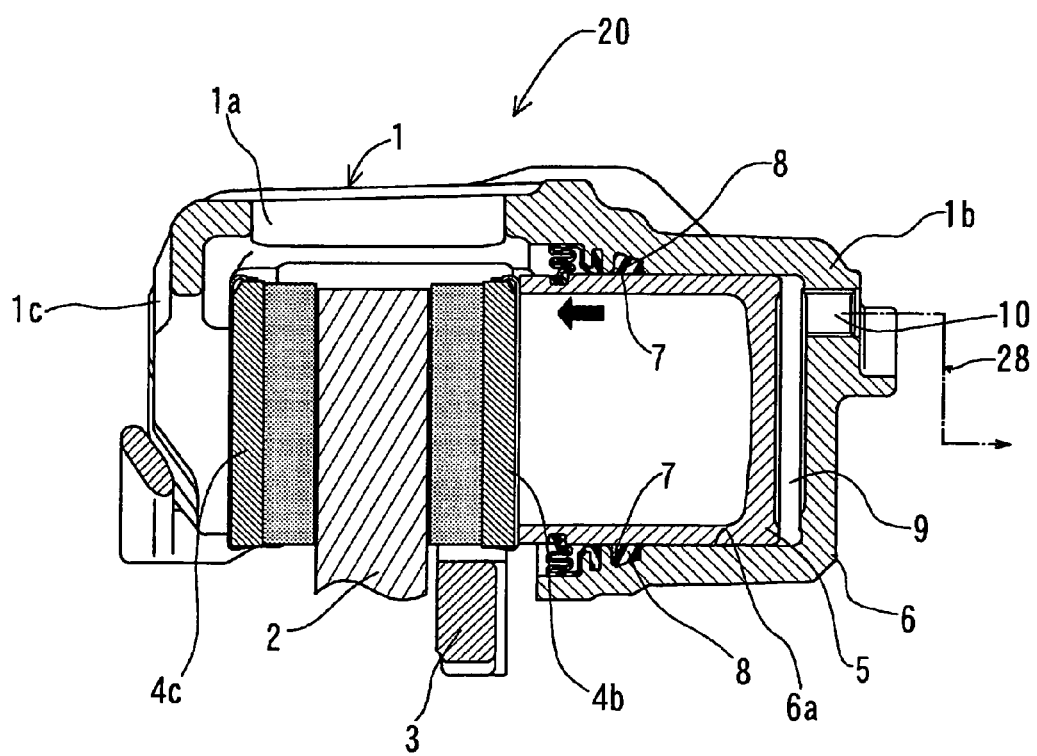
FIG. 2 is a cross-section schematically showing a disc brake including the piston seal member shown in FIG. 1.

FIG. 1 is a cross-section schematically showing a piston seal member 8 according to one embodiment of the invention. FIG. 2 is a cross-section schematically showing a disc brake 20 including the piston seal member 8 shown in FIG. 1. This embodiment illustrates an example of a floating type vehicular disc brake.

Disc Brake

The disc brake 20 according to this embodiment includes the piston seal member 8, a cylinder 6 having a cylinder bore 6a, and a piston 5 inserted into the cylinder bore 6a. The piston seal member 8 is fitted into a ring-shaped piston seal groove 7 formed in the inner circumferential wall of the cylinder bore 6a so that the piston seal member 8 causes the piston 5 inserted into the cylinder bore 6a to come in contact with the cylinder 6 in a fluid-tight and movable manner and rolls back the piston 5 which has moved forward due to hydraulic pressure.

The disc brake 20 includes a bracket 3 secured to a vehicle body (not shown), and a caliper body 1 slidably supported by the bracket 3. The caliper body 1 includes an action section 1b and a reaction section 1c. The piston 5 and the cylinder 6 are formed in the action section 1b. The action section 1b and the reaction section 1c are integrally formed through a bridge section 1a. A pair of friction pads 4b and 4c is disposed to face a friction surface on each side of a disc rotor 2 which rotates together with a wheel (not shown). The caliper body 1 which presses the friction pads 4b and 4c against the disc rotor 2 is movably coupled to the bracket 3 through a slide pin (not shown). The caliper body 1 is made up of the action section 1b disposed at the back of one friction pad 4b, the reaction section 1c disposed at the back of the other friction pad 4c, and the bridge section 1a which connects the action section 1b and the reaction section 1c across the periphery of the disc rotor 2. The friction pad 4b moves by being pressed by the piston 5 inserted into the cylinder bore 6a, and comes in contact with the side surface of the disc rotor 2. The friction pad 4c moves by being pressed by the reaction section 1c, and comes in contact with the other side surface of the disc rotor 2. A braking operation is performed by the above-described operation.

The ring-shaped piston seal groove 7 is formed in the inner circumferential wall of the cylinder bore 6a. The ring-shaped piston seal member 8 is fitted into the piston seal groove 7. The material and the production method for the piston seal member 8 are described later.

A hydraulic chamber 9 is formed between the bottom of the piston 5 and the cylinder 6. A brake fluid is supplied to the hydraulic chamber 9 through a supply port 10. The piston seal member 8 has a function of sealing the brake fluid and a function of rolling back the piston 5 which has moved forward when the hydraulic pressure in the hydraulic chamber 9 decreases. The supply port 10 is connected to an output port (not shown) of a master cylinder (hydraulic pressure source) (not shown) through a hydraulic passage 28.

As shown in FIG. 1, the piston seal groove 7 has a chamfered corner 7a and a chamfered corner 7b. The piston 5 slides forward in the direction indicated by a black arrow in FIG. 1 (toward the disc rotor 2 in FIG. 2), and part of the piston seal member 8 enters the chamfered corner 7a while following the sliding surface of the piston 5. The piston seal member 8 restores its shape due to elasticity when the hydraulic pressure in the hydraulic chamber 9 decreases, whereby the piston 5 is rolled back in the direction opposite to the direction indicated by the arrow. The type of the disc brake 20 is not limited to the pin-slide disc brake employed in this embodiment. The disc brake 20 may be an opposed disc brake in which pistons are disposed on both sides of a disc rotor. The number of pistons and the shape of the piston seal member are not limited to those employed in this embodiment.

Piston Seal Member

The piston seal member 8 according to this embodiment holds the cylinder bore 6a and the piston 5 that slides in the cylinder bore 6a in a fluid-tight and slidable manner. The piston seal member 8 is formed of a crosslinked rubber composition. The rubber composition includes 100 parts by weight of an ethylene-propylene rubber, 20 to 60 parts by weight of a first carbon black, 50 to 100 parts by weight of a second carbon black, and 5 to 20 parts by weight of carbon nanofibers having an average diameter of 0.5 to 500 nm, the total amount of the first carbon black and the second carbon black being 70 to 160 parts by weight. The first carbon black has an average particle diameter of 35 to 100 nm and a DBP absorption of 50 to 200 ml/100 g. The second carbon black has an average particle diameter that is greater than that of the first carbon black and ranges from 60 to 500 nm and a DBP absorption of 5 to 50 ml/100 g. The piston seal member 8 may be used for the caliper body 1 of the disc brake 20 shown in FIG. 2, for example. The unit "parts by weight" indicates "phr" unless otherwise stated. The unit "phr" is the abbreviation for "parts per hundred of resin or rubber", and indicates the percentage of an additive or the like with respect to the rubber or the like.

Ethylene-Propylene Rubber

As the ethylene-propylene rubber, an ethylene-propylene-diene copolymer (EPDM) is preferably used. In order to obtain heat resistance, cold resistance, and attenuation characteristics required for the piston seal member, the ethylene-propylene rubber according to this embodiment preferably includes a third component such as ethylidenenorbornene, and is preferably an EPDM in which the ethylene/propylene copolymerization ratio expressed by the ethylene content is 45 to 80%. The average molecular weight of the ethylene-propylene rubber is preferably 50,000 or more, more preferably 70,000 or more, and particularly preferably about 100,000 to 500,000. If the molecular weight of the ethylene-propylene rubber is within this range, the ethylene-propylene rubber molecules are entangled and linked, whereby the ethylene-propylene rubber easily enters the space between the aggregated carbon nanofibers to exhibit an improved effect of separating the carbon nanofibers. If the molecular weight of the ethylene-propylene rubber is less than 50000, the ethylene-propylene rubber molecules cannot be entangled sufficiently, whereby the effect of dispersing the carbon nanofibers is reduced, even if a shear force is applied in a step described later. If the molecular weight of the ethylene-propylene rubber is greater than 5,000,000, the ethylene-propylene rubber becomes too hard, whereby processing becomes difficult.

The network component of the ethylene-propylene rubber in an uncrosslinked form has a spin-spin relaxation time ($T2n/30°$ C.), measured at 30° C. by a Hahn-echo method using a pulsed nuclear magnetic resonance (NMR) technique, of preferably 100 to 3000 microseconds, and still more preferably 200 to 1000 microseconds. If the ethylene-propylene rubber has a spin-spin relaxation time ($T2n/30°$ C.) within the above range, the ethylene-propylene rubber is flexible and has a sufficiently high molecular mobility. Therefore, when mixing the ethylene-propylene rubber and the carbon nanofibers, the ethylene-propylene rubber can easily enter the space between the carbon nanofibers due to high molecular mobility. If the spin-spin relaxation time ($T2n/30°$ C.) is shorter than 100 microseconds, the ethylene-propylene rubber cannot exhibit a sufficient molecular mobility. If the spin-spin relaxation time ($T2n/30°$ C.) is longer than 3000 microseconds, the ethylene-propylene rubber tends to flow in the same manner as a liquid, whereby it becomes difficult to disperse the carbon nanofibers.

The spin-spin relaxation time obtained by the Hahn-echo method using the pulsed NMR technique is a measure which indicates the molecular mobility of a substance. In more detail, when measuring the spin-spin relaxation time of the ethylene-propylene rubber by the Hahn-echo method using the pulsed NMR technique, a first component having a shorter first spin-spin relaxation time ($T2n$) and a second component having a longer second spin-spin relaxation time ($T2nn$) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the ethylene-propylene rubber. The longer the first spin-spin relaxation time, the higher the molecular mobility and the softer the ethylene-propylene rubber.

As the measurement method for the pulsed NMR technique, a solid-echo method, a Carr-Purcell-Meiboom-Gill (CPMG) method, or a 90-degree pulse method may be applied instead of the Hahn-echo method. However, since the ethylene-propylene rubber according to this embodiment has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

A carbon nanofiber generally has a structure in which the side surface is formed of a six-membered ring of carbon atoms and the end is closed by a five-membered ring. Since the carbon nanofiber has a forced structure, defects tend to occur. Radicals or functional groups tend to be formed at these defects. When mixing the ethylene-propylene rubber and the carbon nanofibers, free radicals produced due to breakage of the ethylene-propylene rubber molecules attack the defects of the carbon nanofibers to produce free radicals on the surfaces of the carbon nanofibers.

Carbon Nanofiber

The carbon nanofibers preferably have an average diameter of 0.5 to 500 nm, and more preferably 0.5 to 100 nm. The carbon nanofibers preferably have an average length of 0.01 to 1000 micrometers. The amount of carbon nanofibers added may be appropriately determined depending on the amounts of first carbon black and second carbon black added to the piston seal member, high-temperature properties required for the piston seal member, and the like. When adding 70 to 160 parts by weight of carbon black based on 100 parts by weight of ethylene-propylene rubber in order to obtain excellent heat resistance, it is preferable to use the carbon nanofibers in an amount of 5 to 20 parts by weight.

As examples of the carbon nanofibers, a carbon nanotube and the like can be given. As the carbon nanotube, a single-layer carbon nanotube having one rolled layer of a single graphite sheet having a hexagonal carbon network (single-walled carbon nanotube (SWNT)), a two-layer carbon nanotube having two rolled layers (double-walled carbon nanotube (DWNT)), a multi-layer carbon nanotube having three or more rolled layers (multi-walled carbon nanotube (MWNT)), or the like is appropriately used. A carbon material having a partial carbon nanotube structure may also be used. The carbon nanotube may also be referred to as a graphite fibril nanotube. Carbon nanofibers graphitized at about 2300° C. to 3200° C. in the presence of a graphitization catalyst such as boron, boron carbide, beryllium, aluminum, or silicon may also be used.

A single-layer carbon nanotube or a multi-layer carbon nanotube is produced to a desired size using an arc discharge method, a laser ablation method, a vapor-phase growth method, or the like. In the arc discharge method, an arc is discharged between electrode materials made of carbon rods in an argon or hydrogen atmosphere at a pressure slightly lower than atmospheric pressure to obtain a multi-layer carbon nanotube deposited on the cathode. When mixing a catalyst such as nickel/cobalt into the carbon rod and discharging an arc, a single-layer carbon nanotube is obtained from soot adhering to the inner side surface of a processing vessel. In the laser ablation method, a target carbon surface into which a catalyst such as nickel/cobalt is mixed is irradiated with strong pulse laser light from a YAG laser in a noble gas (e.g., argon) to melt and vaporize the carbon surface to obtain a single-layer carbon nanotube. In the vapor-phase growth method, a carbon nanotube is synthesized by thermally decomposing hydrocarbons such as benzene or toluene in a vapor phase. As specific examples of the vapor-phase growth method, a floating catalyst method, a zeolite-supported catalyst method, and the like can be given. The carbon nanofibers may be provided with improved adhesion to and wettability with the ethylene-propylene rubber by subjecting the carbon nanofibers to a surface treatment such as an ion-injection treatment, sputter-etching treatment, or plasma treatment before mixing the carbon nanofibers into the ethylene-propylene rubber.

Carbon Black

The first carbon black is used to reinforce the rubber composition. The first carbon black preferably has an average particle diameter of 35 to 100 nm, and more preferably 40 to 75 nm, and a DBP absorption of 50 to 200 ml/100 g, and more preferably 100 to 160 ml/100 g. If the average particle diameter of the first carbon black is less than 35 nm and/or the DBP absorption of the first carbon black is less than 50 ml/100 g, a desired high-temperature reinforcing effect may not be obtained. If the average particle diameter of the first carbon black exceeds 100 nm and/or the DBP absorption of the first carbon black exceeds 200 ml/100 g, a desired reinforcing effect may not be obtained. The rubber composition according to this embodiment exhibits improved rigidity and durability due to a low modulus of elasticity by reinforcing the rubber composition using the first carbon black. Therefore, when using the rubber composition for a piston seal member of a disc brake, a sufficient amount of rollback is obtained, and dragging is reduced.

In order to reduce the coefficient of linear expansion of the rubber composition by reducing the percentage of the rubber polymer in the rubber composition while ensuring hardness and mechanical strength required for the piston seal member, the second carbon black has an average particle diameter greater than that of the first carbon black, and preferably has an average particle diameter of 60 to 500 nm, and more preferably 80 to 150 nm, and a DBP absorption of 5 to 50 ml/100 g, and more preferably 30 to 45 ml/100 g. If the average particle diameter of the second carbon black is less than 60 nm and/or the DBP absorption of the second carbon black is less than 5 ml/100 g, a desired combination of hardness and a coefficient of linear expansion may not be obtained. If the average particle diameter of the second carbon black exceeds 500 nm and/or the DBP absorption of the second carbon black exceeds 50 ml/100 g, a desired reinforcement effect may not be obtained.

Method of Producing Rubber Composition

As a method of producing the rubber composition according to this embodiment, the ethylene-propylene rubber and the carbon nanofibers may be supplied to and mixed in a mixer such as an open roll, a single-screw or twin-screw extruder, a Banbury mixer, or a kneader. A filler (e.g., carbon black) other than the carbon nanofibers is preferably supplied to the mixer before supplying the carbon nanofibers. A process oil is generally used during mixing in an amount approximately equal to the amount of carbon black. It is preferable not to use such a process oil in the production process of the rubber composition according to this embodiment. Specifically, in a hydraulic master cylinder utilizing a piston seal member produced using a process oil, the process oil dissolves in a hydraulic fluid, thereby causing a change in performance with time or a change in heat resistance of the hydraulic fluid.

The step of mixing the ethylene-propylene rubber, the carbon black, and the carbon nanofibers includes a first mixing step of mixing the ethylene-propylene rubber, the first carbon black, the second carbon black, and the carbon nanofibers at a first temperature, a second mixing step of mixing the mixture obtained by the first mixing step at a second temperature, and a third mixing step of tight-milling the mixture obtained by the second mixing step. This embodiment illustrates an example in which an internal mixing method is used in the first mixing step and the second mixing step and an open-roll method is used in the third mixing step.

Figure 3:
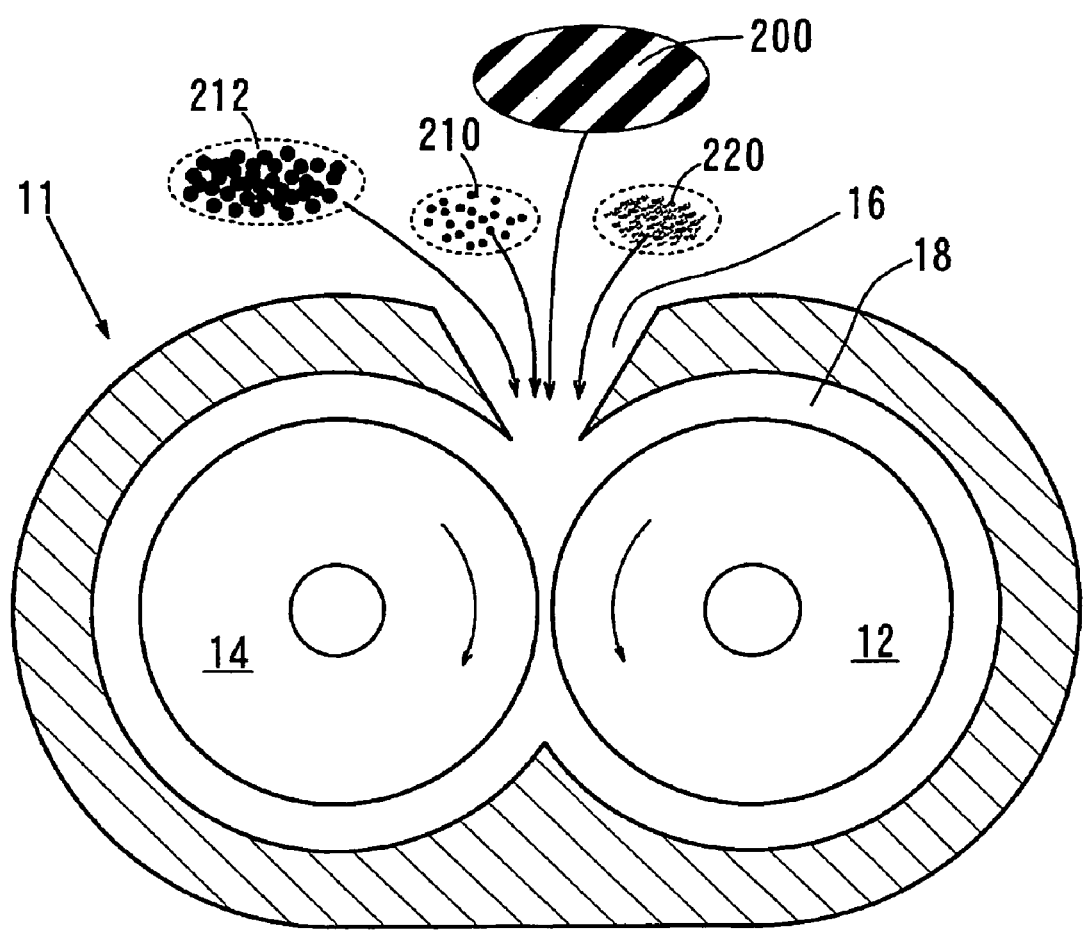
FIG. 3 is a diagram schematically showing a method of producing a rubber composition using an internal mixer.
Figure 4:
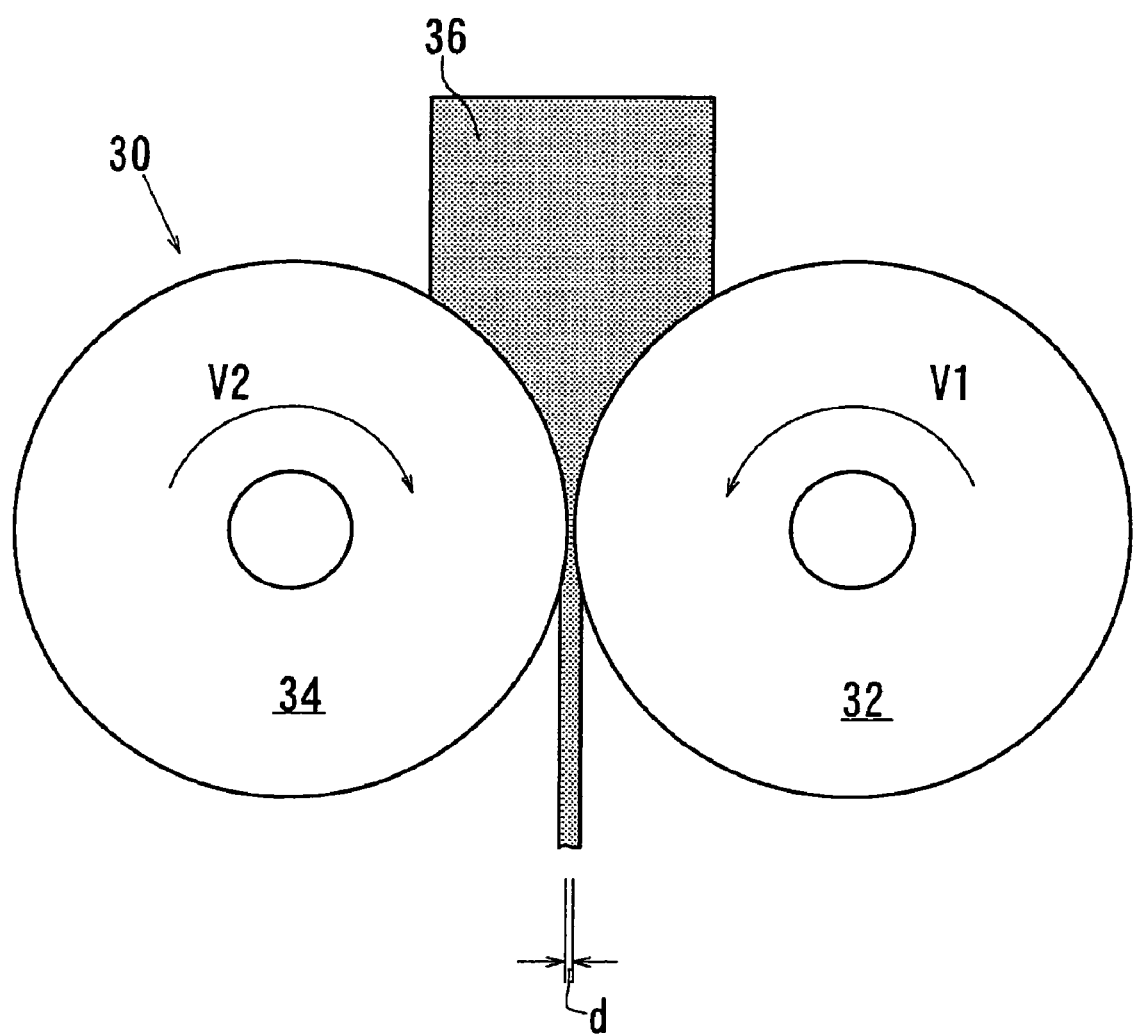
FIG. 4 is a diagram schematically showing a third mixing step (tight milling) for a rubber composition using an open-roll machine.

FIG. 3 is a diagram schematically showing the method of producing the rubber composition using an internal mixer 11 utilizing two rotors. FIG. 4 is a diagram schematically showing the third mixing step (tight milling) of the rubber composition using an open-roll machine. In FIG. 3, the internal mixer 11 includes a first rotor 12 and a second rotor 14. The first rotor 12 and the second rotor 14 are disposed at a specific distance. The ethylene-propylene rubber is mixed by rotating the first rotor 12 and the second rotor 14. In the example shown in FIG. 3, the first rotor 12 and the second rotor 14 are rotated in opposite directions (e.g., directions indicated by arrows in FIG. 3) at a specific velocity ratio. A desired shear force can be obtained by adjusting the velocities of the first rotor 12 and the second rotor 14, the distance between the first and second rotors 12 and 14 and the inner wall of a chamber 18, and the like. A shear force applied in this step is appropriately determined depending on the type of ethylene-propylene rubber, the amounts of the first carbon black, the second carbon black, and the carbon nanofibers, and the like.

Mixing Step

An ethylene-propylene rubber 200 is supplied through a material supply port 16 of the internal mixer 11, and the first and second rotors 12 and 14 are rotated. After the addition of a first carbon black 210, a second carbon black 212, and carbon nanofibers 220 to the chamber 18, the first and second rotors 12 and 14 are further rotated to mix the ethylene-propylene rubber 200 and the carbon nanofibers 220.

First Mixing Step

The first mixing step is then performed in which the mixture obtained by mixing the ethylene-propylene rubber 200 and the carbon nanofibers 220 is further mixed by rotating the first and second rotors 12 and 14 at a specific velocity ratio. In the first mixing step, the ethylene-propylene rubber and the carbon nanofibers are mixed at the first temperature lower than the temperature employed in the second mixing step by 50 to 100° C. in order to obtain a shear force as high as possible. The first temperature is preferably 0 to 50° C., and more preferably 5 to 30° C. If the first temperature is lower than 0° C., mixing may be difficult. If the first temperature is higher than 50° C., a high shear force may not be obtained, whereby the carbon nanofibers may not be dispersed over the entire ethylene-propylene rubber. The first temperature may be set by adjusting the temperature of the chamber 18 or the temperatures of the first and second rotors 12 and 14. The velocity ratio and various temperatures may be controlled while measuring the temperature of the mixture. When performing the first mixing step after the above-described mixing step using the internal mixer 11, the internal mixer 11 may be set at the first temperature in advance.

When using a nonpolar EPDM (ethylene-propylene-diene copolymer rubber) as the ethylene-propylene rubber 200, the carbon nanofibers 220 are dispersed over the entire ethylene-propylene rubber 200 by the first mixing step while forming aggregates.

Second Mixing Step

The mixture obtained by the first mixing step is supplied to another internal mixer 11 to perform the second mixing step. In the second mixing step, mixing occurs at the second temperature higher than the first temperature by 50 to 100° C. in order to produce radicals by cutting the molecules of the ethylene-propylene rubber 200. The temperature of the internal mixer 11 used in the second mixing step has been increased to the second temperature using a heater provided in a rotor or a heater provided in a chamber so that the second mixing step can be performed at the second temperature higher than the first temperature. The second temperature may be appropriately selected depending on the type of ethylene-propylene rubber used. The second temperature is preferably 50 to 150° C. If the second temperature is lower than 50° C., the molecules of the ethylene-propylene rubber may produce radicals to only a small extent, whereby the carbon nanofiber aggregates may not be disentangled. If the second temperature is higher than 150° C., the molecular weight of the ethylene-propylene rubber may decrease considerably, whereby the modulus of elasticity may decrease.

The mixing time of the second mixing step may be appropriately determined depending on the second temperature, the distance between the rotors, the rotational speed, and the like. In this embodiment, mixing effects can be obtained by mixing for about 10 minutes or more. The molecules of the ethylene-propylene rubber 200 are cut to produce radicals by performing the second mixing step, whereby the carbon nanofibers 220 are easily bonded to the radicals of the molecules of the ethylene-propylene rubber.

Third Mixing Step

As shown in FIG. 4, a mixture 36 obtained by the second mixing step is supplied to open rolls 30 set at the first temperature, and the third mixing step (tight-milling step) is performed two or more times (e.g., 10 times) to sheet the mixture 36. The distance d (nip) between a first roll 32 and a second roll 34 is set at 0 to 0.5 mm (e.g., 0.3 mm) at which a shear force becomes higher than those obtained in the first and second mixing steps. The roll temperature is set at a third temperature of 0 to 50° C., and more preferably 5 to 30° C. in the same manner as in the first mixing step. When the surface velocity of the first roll 32 is referred to as V1 and the surface velocity of the second roll 34 is referred to as V2, the surface velocity ratio (V1/V2) of the first roll 32 to the second roll 34 during tight milling is preferably set at 1.05 to 3.00, and more preferably 1.05 to 1.2. A desired shear force can be obtained using such a surface velocity ratio. The tight-milled rubber composition is rolled and sheeted using the rolls. The third mixing step is the final dispersion step of more uniformly dispersing the carbon nanofibers 220 in the ethylene-propylene rubber 200. The third mixing step is effective when a more uniform dispersibility is required. The third mixing step (tight-milling step) causes the ethylene-propylene rubber 200 which has produced radicals to remove the carbon nanofibers 220 one by one, whereby the carbon nanofibers 220 can be further dispersed. A crosslinking agent may also be added and uniformly dispersed in the third mixing step.

As described above, the carbon nanofibers can be dispersed over the entire ethylene-propylene rubber due to a high shear force by performing the first mixing step at the first temperature, and the carbon nanofiber aggregates can be disentangled by the radicals of the molecules of the ethylene-propylene rubber by performing the second mixing step at the second temperature and then performing the third mixing step. Therefore, the carbon nanofibers can be dispersed over the entire nonpolar ethylene-propylene rubber such as EPDM, whereby a rubber composition without carbon nanofiber aggregates can be produced. In particular, since the ethylene-propylene rubber 200 has elasticity, viscosity, and chemical interaction with the carbon nanofibers 220, the carbon nanofibers 220 can be easily dispersed in the ethylene-propylene rubber 200. In the first to third mixing steps, a shear force is also applied in the direction in which the carbon nanofibers are separated due to a number of complicated flows (turbulent flows) of the elastomer which occur around the first carbon black 210 and the second carbon black 212. Therefore, since the carbon nanofibers move in the flow directions of the respective elastomer molecules bonded to the carbon nanofibers due to chemical interaction, the carbon nanofibers are uniformly dispersed in the elastomer. As a result, a rubber composition in which the carbon nanofibers 220 exhibit excellent dispersibility and dispersion stability (i.e., the carbon nanofibers rarely reaggregate) can be obtained.

Specifically, when mixing the ethylene-propylene rubber and the carbon nanofibers using the open rolls, the viscous ethylene-propylene rubber enters the space between the carbon nanofibers, and a specific portion of the ethylene-propylene rubber is bonded to a highly active site of the carbon nanofiber through chemical interaction. When a high shear force is then applied to the ethylene-propylene rubber, the carbon nanofibers also move along with the movement of the molecules of the ethylene-propylene rubber, whereby the aggregated carbon nanofibers are separated by the restoring force of the ethylene-propylene rubber due to elasticity which occurs after shearing, and become dispersed in the ethylene-propylene rubber. According to this embodiment, when the rubber composition is extruded through the narrow space between the rolls, the rubber composition is deformed to have a thickness greater than the roll distance as a result of the restoring force of the ethylene-propylene rubber due to elasticity. It is estimated that the above deformation causes the rubber composition to which a high shear force is applied to flow in a more complicated manner to disperse the carbon nanofibers in the ethylene-propylene rubber. The carbon nanofibers which have been dispersed are prevented from reaggregating due to the chemical interaction with the ethylene-propylene rubber, whereby excellent dispersion stability can be obtained.

In the first and second mixing steps of dispersing the carbon nanofibers in the ethylene-propylene rubber due to a shear force, it is preferable to use an internal mixer from the viewpoint of processability. Note that other mixers such as open rolls may also be used. As the internal mixer, a tangential or intermeshing mixer such as a Banbbury mixer, a kneader, or a Brabender may be employed. The first, second, and third mixing steps may be performed using a multi-screw extrusion kneading method (e.g., twin-screw extruder) instead of the internal mixing method and the open-roll method. The mixers may be appropriately used in combination depending on the amount of production and the like. It is particularly preferable to use the open-roll method in the third mixing step since the actual temperature of the mixture can be measured and managed while controlling the roll temperature.

In the method of producing the rubber composition, a crosslinking agent may be mixed into the rubber composition during the first to third mixing steps, or may be mixed into the rubber composition which has been sheeted by tight milling in the third mixing step. The resulting rubber composition is extrusion-molded or injection-molded using a mold having the shape of a piston seal member to obtain a piston seal member formed of the crosslinked rubber composition.

In the method of producing the rubber composition according to this embodiment, a compounding ingredient generally used when processing an ethylene-propylene rubber may be used. As the compounding ingredient, a known compounding ingredient may be used. As examples of the compounding ingredient, a crosslinking agent, a vulcanizing agent, a vulcanization accelerator, a vulcanization retarder, a softener, a plasticizer, a curing agent, a reinforcing agent, a filler, an aging preventive, a colorant, and the like can be given. These compounding ingredients may be added to the ethylene-propylene rubber before supplying the carbon nanofibers to the mixer, or may be added during the first to third mixing steps, for example.

In the method of producing the piston seal member rubber composition according to this embodiment, the carbon nanofibers are directly mixed into the ethylene-propylene rubber exhibiting rubber elasticity. Note that the method is not limited thereto. The following method may also be employed. Specifically, before mixing the carbon nanofibers into the ethylene-propylene rubber, the ethylene-propylene rubber is masticated to reduce the molecular weight of the ethylene-propylene rubber. Since the viscosity of the ethylene-propylene rubber decreases due to a decrease in molecular weight as a result of mastication, the ethylene-propylene rubber easily enters the space between the aggregated carbon nanofibers. The network component of the raw material ethylene-propylene rubber in uncrosslinked form has a first spin-spin relaxation time ($T2n$), measured at 30° C. by the Hahn-echo method using the pulsed NMR technique, of 100 to 3000 microseconds. The raw material ethylene-propylene rubber is masticated to reduce the molecular weight of the ethylene-propylene rubber to obtain a liquid ethylene-propylene rubber having a first spin-spin relaxation time ($T2n$) of more than 3000 microseconds. The first spin-spin relaxation time ($T2n$) of the liquid ethylene-propylene rubber after mastication is preferably 5 to 30 times the first spin-spin relaxation time ($T2n$) of the raw material ethylene-propylene rubber before mastication. The above mastication is performed until the ethylene-propylene rubber is liquefied (i.e., until the ethylene-propylene rubber exhibits liquidity which is not suitable for mixing) by cutting the molecules of the ethylene-propylene rubber by applying a high shear force using the open-roll method or the like to reduce the molecular weight of the ethylene-propylene rubber to a large extent, differing from normal mastication performed in a state in which the ethylene-propylene rubber is solid. For example, when using the open-roll method, mastication is performed at a roll temperature of 20° C. (minimum mastication time: 60 minutes) to 150° C. (minimum mastication time: 10 minutes). The roll distance d is set at 0.1 to 1.0 mm, for example. The first carbon black, the second carbon black, and the carbon nanofibers are then supplied to the liquid ethylene-propylene rubber obtained by mastication. However, since the elasticity of the liquid ethylene-propylene rubber has been significantly reduced, the aggregated carbon nanofibers are dispersed to only a small extent, even if the ethylene-propylene rubber and the carbon nanofibers are mixed in a state in which free radicals of the ethylene-propylene rubber are bonded to the carbon nanofibers.

Therefore, the molecular weight of the ethylene-propylene rubber in the mixture obtained by mixing the liquid ethylene-propylene rubber and the carbon nanofibers is increased to cause the ethylene-propylene rubber to recover its elasticity to obtain a rubber elastic body mixture, and the carbon nanofibers are uniformly dispersed in the ethylene-propylene rubber by tight milling using the open-roll method or the like. The network component of the rubber elastic body mixture in which the molecular weight of the ethylene-propylene rubber has been increased has a first spin-spin relaxation time ($T2n$), measured at 30° C. by the Hahn-echo method using the pulsed NMR technique, of 3000 microseconds or less. The first spin-spin relaxation time ($T2n$) of the rubber elastic body mixture in which the molecular weight of the ethylene-propylene rubber has been increased is preferably 0.5 to 10 times the first spin-spin relaxation time ($T2n$) of the raw material ethylene-propylene rubber before mastication. The elasticity of the rubber elastic body mixture may be expressed by the molecular form (which may be determined based on the molecular weight) and the molecular mobility (which may be determined based on the first spin-spin relaxation time ($T2n$)) of the ethylene-propylene rubber. The step of increasing the molecular weight of the ethylene-propylene rubber is preferably performed by placing the mixture in a heating furnace set at 40 to 100° C. and heating the mixture for 10 to 100 hours, for example. This causes the molecular chain of the ethylene-propylene rubber to extend due to bonding between free radicals of the ethylene-propylene rubber in the mixture, whereby the molecular weight of the ethylene-propylene rubber increases. The molecular weight of the ethylene-propylene rubber may be increased in a short time by mixing a small amount (e.g., ½ or less of a normal amount) of a crosslinking agent into the mixture and heating (e.g., annealing) the mixture to effect a crosslinking reaction. When increasing the molecular weight of the ethylene-propylene rubber by a crosslinking reaction, it is preferable to set the amount of crosslinking agent, the heating time, and the heating temperature so that mixing in the subsequent step is not hindered.

According to the above-described method of producing the piston seal member rubber composition, the carbon nanofibers can be more uniformly dispersed in the ethylene-propylene rubber by reducing the viscosity of the ethylene-propylene rubber before supplying the carbon nanofibers. Specifically, the liquid ethylene-propylene rubber of which the molecular weight has been reduced easily enters the space between the aggregated carbon nanofibers as compared with the above-described method in which the carbon nanofibers are mixed into the ethylene-propylene rubber having a high molecular weight, whereby the carbon nanofibers can be more uniformly dispersed in the tight milling step. Since a large number of free radicals of the ethylene-propylene rubber produced by cutting the molecules of the ethylene-propylene rubber can be strongly bonded to the surface of the carbon nanofibers, the carbon nanofibers can be further uniformly dispersed. Therefore, the above-described production method enables an equivalent performance to be obtained with a reduced amount of carbon nanofibers, whereby economic efficiency can be improved by saving expensive carbon nanofibers.

The resulting rubber composition is extrusion-molded or injection-molded using a mold having the shape of a piston seal member in the presence of an appropriate amount of crosslinking agent to obtain a piston seal member formed of the crosslinked rubber composition.

Properties of Rubber Composition

In the rubber composition, the carbon nanofibers having an average diameter of 0.5 to 500 nm are uniformly dispersed in the ethylene-propylene rubber (matrix). The rubber composition in uncrosslinked form has a first spin-spin relaxation time ($T2n$), measured at 150° C. by the Hahn-echo method using the pulsed NMR technique, of 100 to 3000 microseconds, and a fraction (fnn) of components having a second spin-spin relaxation time ($T2nn$) of less than 0.2. The rubber composition may be crosslinked and formed into a piston seal member. The rubber composition in crosslinked form preferably has a first spin-spin relaxation time ($T2n$), measured at 150° C. by the Hahn-echo method using the pulsed NMR technique, of 100 to 2000 microseconds, and a fraction (fnn) of components having a second spin-spin relaxation time ($T2nn$) of less than 0.2.

The first spin-spin relaxation time ($T2n$) and the fraction (fnn) of the rubber composition indicate whether or not the carbon nanofibers are uniformly dispersed in the ethylene-propylene rubber (matrix). Specifically, when the carbon nanofibers are uniformly dispersed in the ethylene-propylene rubber, the ethylene-propylene rubber is restrained by the carbon nanofibers. In this state, the mobility of the ethylene-propylene rubber molecules restrained by the carbon nanofibers is lower than that of the ethylene-propylene rubber molecules which are not restrained by the carbon nanofibers. Therefore, the first spin-spin relaxation time (T2$n$), the second spin-spin relaxation time (T2$nn$), and the spin-lattice relaxation time (T1) of the rubber composition according to this embodiment are shorter than those of the ethylene-propylene rubber which does not include the carbon nanofibers. In particular, the first spin-spin relaxation time (T2$n$), the second spin-spin relaxation time (T2$nn$), and the spin-lattice relaxation time (T1) are further reduced by uniformly dispersing the carbon nanofibers. The spin-lattice relaxation time (T1) of the rubber composition in crosslinked form changes in proportion to the amount of carbon nanofibers mixed.

When the ethylene-propylene rubber molecules are restrained by the carbon nanofibers, the number of non-network components (non-reticulate chain components) is considered to be reduced for the following reasons. Specifically, when the molecular mobility of the entire ethylene-propylene rubber decreases due to the carbon nanofibers, the amount of non-network components which cannot easily move increases, whereby the non-network components tend to behave in the same manner as the network components. Moreover, since the non-network components (terminal chains) easily move, the non-network components tend to be adsorbed on the active sites of the carbon nanofibers. It is considered that these phenomena decrease the amount of non-network components. Therefore, the fraction (fnn) of components having the second spin-spin relaxation time (T2$nn$) becomes smaller than that of the ethylene-propylene rubber which does not include the carbon nanofibers. Note that the fraction (fn) of components having the first spin-spin relaxation time (T2$n$) becomes greater than that of the ethylene-propylene rubber which does not include the carbon nanofibers, since fn+fnn=1.

Therefore, when the rubber composition according to this embodiment has values measured by the Hahn-echo method using the pulsed NMR technique within the above ranges, the carbon nanofibers are uniformly dispersed in the rubber composition.

The spin-lattice relaxation time (T1) measured by an inversion recovery method using the pulsed NMR technique is a measure which indicates the molecular mobility of a substance together with the spin-spin relaxation time (T2). Specifically, the shorter the spin-lattice relaxation time of the ethylene-propylene rubber, the lower the molecular mobility and the harder the ethylene-propylene rubber. The longer the spin-lattice relaxation time of the ethylene-propylene rubber, the higher the molecular mobility and the softer the ethylene-propylene rubber.

The crosslinked rubber composition thus obtained exhibits excellent creeping properties at a high temperature (e.g., 200° C.), and a piston seal member formed using the rubber composition exhibits excellent heat resistance. The rubber composition preferably has a hardness (JIS-A) of 80 to 95, and more preferably 90 to 95. The crosslinked rubber composition preferably has a dynamic modulus of elasticity at 10 Hz and 30° C. of 60 to 90 MPa and a dynamic modulus of elasticity at 10 Hz and 200° C. of 30 to 40 MPa. If the crosslinked rubber composition has a dynamic modulus of elasticity at 200° C. of 30 to 40 MPa, the resulting piston seal member has a moderate amount of rollback at a high temperature.

The crosslinked rubber composition preferably has a compression set at 200° C. after 24 hours of 14% or less and a compression set at 230° C. after 24 hours of 24% or less. Such a rubber composition exhibits desired compression set resistance. The crosslinked rubber composition preferably has an instantaneous strain of 2% or less and a steady-state strain of −2000 ppm/hour to +2000 ppm/hour in a creep test conducted at a temperature of 200° C. and a load of 250 KPa. Such a rubber composition exhibits excellent creep resistance at a high temperature.

The invention is not limited to the above embodiments. Various modifications and variations may be made without departing from the spirit and scope of the invention.

The above embodiments illustrate a piston seal member provided in a vehicular disc brake. Note that the invention may be applied to other piston seal members. In particular, the invention is useful for a piston seal member used in a high temperature region of 200° C. or more, for example.

Examples according to the invention and comparative examples are described below. Note that the invention is not limited to the following examples.

(1) Preparation of Rubber Composition Sample (a) A Brabender (internal mixer) (chamber temperature: 20° C.) was charged with a specific amount (100 g) of an ethylene-propylene rubber (100 parts by weight (phr)) shown in Table 1.

(b) Carbon black was added to the ethylene-propylene rubber in an amount (parts by weight (phr)) shown in Table 1. Carbon nanofibers were then added to the ethylene-propylene rubber.

(c) After the addition of the carbon nanofibers, the mixture of the ethylene-propylene rubber, carbon black, and carbon nanofibers was masticated and removed from the rotors.

(d) The mixture obtained by (c) was placed between rotors of an internal mixer set at 20° C., subjected to the first mixing step for 10 minutes, then removed from the rotors.

(e) The mixture obtained by (d) was supplied to an internal mixer set at 100° C., subjected to the second mixing step for 10 minutes, then removed from the internal mixer.

(f) The mixture obtained by (e) was supplied to 6-inch open rolls set at a roll distance (nip) of 0.3 mm and a roll temperature of 20° C., and was tight-milled ten times (third mixing step). The tight-milled mixture was rolled and sheeted to a thickness of about 1.1 mm. The sheeted rubber composition was press-molded at 90° C. for five minutes to obtain sheet-shaped uncrosslinked rubber composition samples with a thickness of 1 mm. A peroxide and a cocrosslinking agent were added to the sheeted rubber composition. The components were mixed using open rolls and sheeted at a roll distance of 1.1 mm. The sheeted rubber composition was press-crosslinked at 175° C. for 20 minutes. Crosslinked rubber composition samples of Examples 1 to 4 and Comparative Examples 1 and 2 were thus obtained.

In Table 1, "EPDM" indicates an ethylene-propylene rubber manufactured by JSR Corporation (EPDM: ethylene-propylene-diene copolymer rubber) (EP103AF), "MWNT13" indicates vapor-grown multi-walled carbon nanotubes having an average diameter of about 13 nm, "MWNT100" indicates vapor-grown multi-walled carbon nanotubes having an average diameter of about 100 nm, "SRF-HS" indicates the first carbon black (average particle diameter: 72 nm, DBP absorption: 152 ml/100 g), "FEF" also indicates the first carbon black (average particle diameter: 43 nm, DBP absorption: 115 ml/100 g), "MT" indicates the second carbon black (average particle diameter: 122 nm, DBP absorption 41 ml/100 g), and "HAF-HS" indicates carbon black (average particle diameter: 27 nm, DBP absorption: 101 ml/100 g) having an average particle diameter smaller than those of the first carbon black and the second carbon black.

(2) Production of Piston Seal Member

Each rubber composition obtained by (1) was injection-molded to obtain crosslinked piston seal members of Examples 1 to 4 and Comparative Examples 1 and 2.

(3) Measurement of Flexibility Using Pulsed NMR Technique

Each uncrosslinked rubber composition sample was subjected to measurement by the Hahn-echo method and the iterative method using the pulsed NMR technique. The measurement was conducted using a JMN-MU25 manufactured by JEOL, Ltd. The measurement was conducted under conditions of an observing nucleus of $^1H$, a resonance frequency of 25 MHz, and a 90-degree pulse width of 2 microseconds. A decay curve was determined while changing Pi in the pulse sequence (90°x-Pi-180°x) of the Hahn-echo method. The measurement was conducted in a state in which the uncrosslinked rubber composition sample was inserted into a sample tube within an appropriate magnetic field range. The measurement temperature was 150° C. The first spin-spin relaxation time ($T2n$) of the raw material EPDM (measurement temperature: 30° C.) and the first spin-spin relaxation time ($T2n$) and the fraction (fnn) of components having a second spin-spin relaxation time of each uncrosslinked rubber composition sample were determined. The results are shown in Table 1.

(4) Measurement of Static Properties

The rubber hardness (JIS-A), the tensile strength (TB), and the elongation at break (EB) of each crosslinked rubber composition sample were measured. The rubber hardness (JIS-A) was measured in accordance with JIS K 6253. The tensile strength (TB) and the elongation at break (EB) were measured in accordance with JIS K 6521-1993. The results are shown in Table 1.

(5) Measurement of Dynamic Properties

Each crosslinked rubber composition sample was subjected to a dynamic viscoelasticity test using a dynamic viscoelasticity tester DMS6100 manufactured by SII at a chuck distance of 20 mm, a measurement temperature of −100 to 300° C., a dynamic strain of ±0.05%, and a frequency of 10 Hz in accordance with JIS K 6394 to measure the dynamic modulus of viscoelasticity (E') at 30° C. and 200° C. The compression set (JIS K 6262) of each crosslinked rubber composition sample was measured. The compression set was measured under a first condition (200° C., 24 hours, 25% compression) and a second condition (230° C., 24 hours, 25% compression). The compression set was measured to evaluate the compression set resistance of the piston seal member at a high temperature. Each crosslinked rubber composition sample was subjected to a creep test at a temperature of 200° C. and a load of 250 KPa to measure the instantaneous strain and the steady-state strain. The results are shown in Table 1.

(6) High-Temperature and High-Pressure Operation Durability Test

Each piston seal member was installed in a durability test disc brake. The disc brake was repeatedly operated at a hydraulic pressure of 13 MPa and a fluid temperature of 200° C. The number of operations at which the piston seal member broke was determined. The results are shown in Table 1. In Table 1, a case where the piston seal member did not break during one hundred thousand times of repeated operations and abnormalities such as leakage did not occur is indicated by "Good".

TABLE 1

| | | | | Example 1 | Example 2 | Example 3 | Example 4 | Comparative Example 1 | Comparative Example 2 |
|---|---|---|---|---|---|---|---|---|---|
| Components of rubber composition | Raw material elastomer | EPDM | phr | 100 | 100 | 100 | 100 | 100 | 100 |
| | Carbon black | SRF-HS | phr | 40 | 40 | 0 | 0 | 0 | 0 |
| | | FEF | phr | 0 | 0 | 40 | 40 | 40 | 40 |
| | | MT | phr | 80 | 80 | 80 | 80 | 80 | 80 |
| | | HAF | phr | 0 | 0 | 0 | 0 | 0 | 20 |
| | Carbon nanofiber | MWNT13 | phr | 5 | 10 | 0 | 0 | 0 | 0 |
| | | MWNT100 | phr | 0 | 0 | 5 | 10 | 0 | 0 |
| | Other components | Organic peroxide | phr | 2.5 | 2.5 | 2.5 | 2.5 | 2.5 | 2.5 |
| | | Cocrosslinking agent | phr | 1 | 1 | 1 | 1 | 1 | 1 |
| Results of measurement using pulsed NMR technique | Raw material EPDM | T2n (30° C.) | Microsecond | 520 | 520 | 520 | 520 | 520 | 520 |
| | Uncrosslinked rubber composition | T2n (150° C.) | Microsecond | 630 | 560 | 2020 | 1970 | 3860 | 4040 |
| | Uncrosslinked rubber composition | fnn (150° C.) | | 0.19 | 0.16 | 0.16 | 0.14 | 0.28 | 0.31 |
| Material properties of crosslinked rubber composition | Static properties | Hardness | JIS A | 90 | 91 | 91 | 90 | 85 | 91 |
| | | Elongation at break | % | 50 | 60 | 110 | 140 | 120 | 80 |
| | | Tensile strength | MPa | 11.3 | 11.3 | 15.2 | 14 | 14.2 | 15.8 |
| | Dynamic properties | E' (30° C.) | MPa | 82.7 | 79.5 | 68.9 | 75.2 | 16.5 | 111 |
| | | E' (200° C.) | MPa | 32.9 | 30.1 | 31.5 | 33.6 | 12.5 | 32 |
| | | Compression set (200° C., 24 hours) | % | 6 | 7 | 12 | 11 | 9 | 12 |
| | | Compression set (230° C., 24 hours) | % | 14 | 14 | 22 | 17 | 14 | 27 |
| | | Creep (instantaneous strain) | % | 0.89 | 0.93 | 1.07 | 1.26 | 3.05 | 2.05 |
| | | Creep (steady-state strain) | ppm/hr | −900 | −1100 | −1500 | −1600 | 12000 | 2100 |
| High-temperature and high-pressure operation durability of piston seal member | | | Number of operations at which piston seal member broke | Good | Good | Good | Good | 200 | 10,000 |

From the results shown in Table 1, the following items were confirmed by Examples 1 to 4 according to the invention. Specifically, the piston seal members of Examples 1 to 4 exhibited excellent high-temperature and high-pressure operation durability (i.e., heat resistance) at a fluid temperature of 200° C. as compared with the piston seal members of Comparative Examples 1 and 2. The crosslinked rubber compositions used for the piston seal members of Examples 1 to 4 had a hardness (JIS-A) of 80 to 95, a dynamic modulus of elasticity at 30° C. of 60 to 90 MPa, and a dynamic modulus of elasticity at 200° C. of 30 to 40 MPa. The crosslinked rubber compositions of Examples 1 to 4 had a compression set at 200° C. of 14% or less and a compression set at 230° C. of 24% or less. In particular, the crosslinked rubber compositions of Examples 1 to 4 had an instantaneous strain of 2% or less and a steady-state strain of −2000 ppm/hour to +2000 ppm/hour in the creep test conducted at 200° C. The crosslinked rubber compositions of Examples 1 to 4 exhibited excellent creep resistance as compared with the crosslinked rubber compositions of Comparative Examples 1 and 2.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A piston seal member which holds a cylinder bore and a piston that slides in the cylinder bore in a fluid-tight and slidable manner,
    the piston seal member being formed of a crosslinked rubber composition, the rubber composition including 100 parts by weight of an ethylene-propylene rubber, 20 to 60 parts by weight of a first carbon black, 50 to 100 parts by weight of a second carbon black, and 5 to 20 parts by weight of carbon nanofiber having an average diameter of 0.5 to 500 nm, the total amount of the first carbon black and the second carbon black being 70 to 160 parts by weight,
    the first carbon black having an average particle diameter of 35 to 100 nm and a DBP absorption of 50 to 200 ml/100 g, and
    the second carbon black having an average particle diameter that is greater than the average particle diameter of the first carbon black and ranges from 60 to 500 nm and a DBP absorption of 5 to 50 ml/100 g.

2. The piston seal member as defined in claim 1,
    wherein the carbon nanofibers are uniformly dispersed in the ethylene-propylene rubber; and
    wherein the rubber composition in uncrosslinked form has a first spin-spin relaxation time (T2$n$), measured at 150° C. by a Hahn-echo method using a pulsed NMR technique, of 100 to 3000 microseconds, and a fraction (fnn) of components having a second spin-spin relaxation time (T2$nn$) of less than 0.2.

3. The piston seal member as defined in claim 1, wherein the rubber composition has a hardness (JIS-A) of 80 to 95.

4. The piston seal member as defined in claim 1,
    wherein the rubber composition has a dynamic modulus of elasticity at 10 Hz and 30° C. of 60 to 90 MPa and a dynamic modulus of elasticity at 10 Hz and 200° C. of 30 to 40 MPa.

5. The piston seal member as defined in claim 1,
    wherein the rubber composition has a compression set at 200° C. after 24 hours of 14% or less and a compression set at 230° C. after 24 hours of 24% or less.

6. The piston seal member as defined in claim 1, wherein the rubber composition has an instantaneous strain of 2% or less and a steady-state strain of −2000 ppm/hour to +2000 ppm/hour in a creep test conducted at a temperature of 200° C. and a load of 250 KPa.

7. The piston seal member as defined in claim 1, the piston seal member being used for a caliper body of a disc brake.

8. A disc brake comprising:
    the piston seal member as defined in claim 1;
    a cylinder having the cylinder bore; and
    the piston inserted into the cylinder bore,
    the piston seal member being fitted into a ring-shaped groove formed in an inner wall of the cylinder bore, the piston seal member causing the piston inserted into the cylinder bore to come in contact with the cylinder in a fluid-tight and movable manner and rolling back the piston which has been moved forward due to hydraulic pressure.

* * * * *